J. Carroll,
Glass Furnace.

No. 48,903. Patented July 25, 1865.

Witnesses:
Wm Albert Steel
W. R. Delany

J. Carrol,
by his Attorney.
Henry Howson

UNITED STATES PATENT OFFICE.

JOHN CARROLL, OF LONGACOMING, NEW JERSEY.

IMPROVEMENT IN GLASS-FURNACES.

Specification forming part of Letters Patent No. 48,903, dated July 25, 1865.

*To all whom it may concern:*

Be it known that I, JOHN CARROLL, of Longacoming, Camden county, New Jersey, have invented an Improvement in Glass-Furnaces; and I do hereby declare the following to be a full, clear, and exact description of the same, reference being had to the accompanying drawings, and to the letters of reference marked thereon.

My invention consists of the arrangement, described hereinafter, of three fire-chambers in respect to the two benches and side walls of a glass-furnace, whereby I am enabled to melt glass fifty per cent. more quickly than in an ordinary furnace, with a comparatively small increase in the quantity of fuel, and with less injury to the pots containing the glass.

In order to enable others skilled in the art to make and use my invention, I will now proceed to describe its construction and operation.

Figure 1:
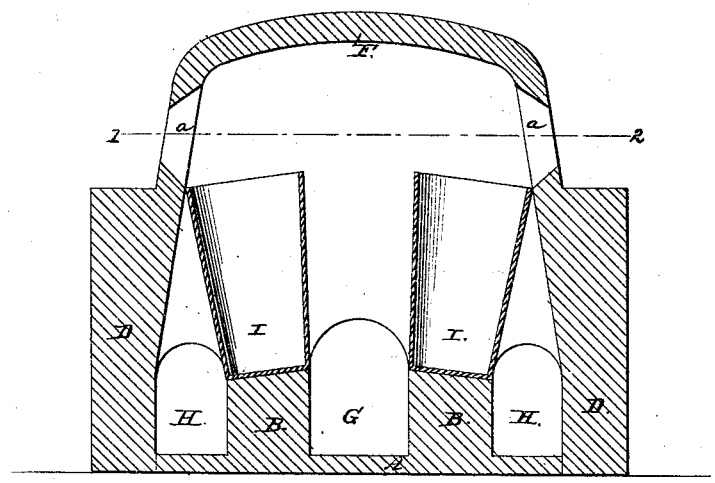
Figure 2:
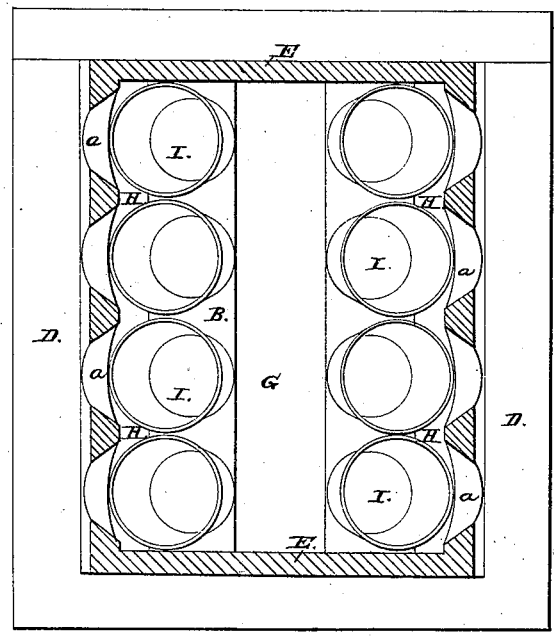

On reference to the accompanying drawings, which form a part of this specification, Figure 1 is a vertical section of my improved glass-furnace, and Fig. 2 a sectional plan on the line 1 2, Fig. 1.

A is the foundation of the furnace. B B are the two benches; D D, the side walls; E E, the end walls; F, the roof, and *a a* the usual ring-holes.

In ordinary furnaces of this class the benches for receiving the melting-pots I are built directly against the side walls. There being but one central fire-chamber, the pots are consequently exposed to a greater heat on one side than the other, and the process of melting the glass is tedious.

My improved furnace has three fire-chambers—namely, the central fire-chamber, G, between the two benches B B, and two chambers, H H, one located between each bench and the adjacent side wall. The upper surface of each bench is inclined downward, so that the pots I may lean toward the wall, and so that their contents may be more readily examined through the ring-holes *a a* than if they were in a vertical position. It will be evident that by this arrangement of fire-chambers the pots are exposed to a more uniform heat than when a central chamber only is used.

I have found by practical tests that, although somewhat more fuel is consumed in my improved furnace than in those of ordinary construction, the glass can be melted fifty per cent. more quickly in the former than in the latter, and that this increased rapidity in the process of melting the glass much more than compensates for the small additional quantity of fuel required.

I have also found that the pots when used in my improved furnace last much longer than when used in common furnaces.

I claim as my invention and desire to secure by Letters Patent—

The construction and arrangement described of the three fire-chambers H H and G in respect to the two benches B B and side walls, D D, of the furnace, for the purpose specified.

In testimony whereof I have signed my name to this specification in the presence of two subscribing witnesses.

JOHN CARROLL.

Witnesses:
HENRY HOWSON,
W. J. R. DELANY.